United States Patent [19]

Waldenberger

[11] Patent Number: 4,839,206

[45] Date of Patent: Jun. 13, 1989

[54] DOUBLE SIDED ADHESIVE TAPE

[75] Inventor: Dean H. Waldenberger, Glens Falls, N.Y.

[73] Assignee: Norton Company, Worcester, Mass.

[21] Appl. No.: 96,702

[22] Filed: Sep. 15, 1987

[51] Int. Cl.$^4$ .............................................. A61F 13/02
[52] U.S. Cl. ...................................... 428/40; 427/208; 427/208.8; 427/209; 428/352; 428/354; 428/447
[58] Field of Search ...................... 427/209, 208, 208.4, 427/208.8; 428/40, 352, 354, 447

[56] References Cited

U.S. PATENT DOCUMENTS

| | | | |
|---|---|---|---|
| 2,496,349 | 2/1950 | Kellgren et al. | 428/40 |
| 2,829,073 | 4/1958 | Williams | 428/40 X |
| 2,882,183 | 5/1956 | Bond et al. | 117/68.5 |
| 3,839,075 | 10/1974 | Moriyama et al. | 117/76 |
| 3,959,210 | 5/1976 | Lipatova et al. | 260/42.13 |
| 4,415,615 | 11/1983 | Esmay et al. | 428/40 |

FOREIGN PATENT DOCUMENTS 2268654 11/1975 France .
0056471 3/1984 Japan .

OTHER PUBLICATIONS

Pages 39–43, Handbook of Pressure Sensitive Adhesive Technology, 1982—published by Van Nostrand Reinhold Co., N.Y.

Technology on a Roll—Acrylic Foam Tape #4205 Product Bulletin, published by The Minnesota Mining and Manufacturing Company.

*Primary Examiner*—Bernard Pianalto
*Attorney, Agent, or Firm*—Arthur A. Loiselle, Jr.

[57] ABSTRACT

A double sided adhesive tape with a low surface energy adhesive on at least one side. The low surface energy adhesive has superior properties when the adherend is of the low surface energy type such as low surface energy acrylic paint, polyethylene, polytetrafluoroethylene and the like and the surface energy of the adhesive is lower than that of the adherend.

5 Claims, No Drawings

DOUBLE SIDED ADHESIVE TAPE

TECHNICAL FIELD

The invention relates to double sided pressure sensitive adhesive tape, and more particularly to such adhesive tape which carries a different adhesive on each side or face thereof.

BACKGROUND AND INFORMATION DISCLOSURE STATEMENT

The following publications are representative of the most relevant prior art known to the Applicant at the time of filing of the application.

UNITED STATES PATENTS

U.S. Pat. No. 2,882,183, Apr. 14, 1959, H. M. Bond et al.,
U.S. Pat. No. 3,839,075, Oct. 1, 1974, Moriyama et al.,
U.S. Pat. No. 3,959,210, May 25, 1976 Lipatova et al.,
U.S. Pat. No. 4,415,615, Nov. 15, 1983 Esmay et al.

OTHER PUBLICATIONS

Handbook of Pressure Sensitive Adhesive Technology, pages 39 to 43, 1982.

Technology on a Roll—Acrylic Foam Tape #4205, Product Bulletin, published by the Minnesota Mining and Manufacturing Company.

Pressure sensitive adhesive tapes, including the so-called double sided tapes are well known and are available with a wide variety of properties depending on the end use. Because of their ability to form an immediate bond at room temperature, such tapes are commonly utilized for attaching, sealing, mending, and masking. Basically, a pressure sensitive adhesive tape is made up of sheet like backing or support member which is coated on one or both sides with a pressure sensitive adhesive. There are numerous pressure sensitive adhesives available, one of the more popular adhesive types is the acrylate based adhesives. However, whatever type of adhesive is used, if it's to be effective, it must have a proper balance of tack, adhesion, and cohesion. An additional property of concern is the adhesive's or the tape's compliance, i.e. the adhesive's or tape's ability to conform to the adherend or substrate. While tack, adhesion and cohesion are exclusively the properties of the adhesive per se, compliance can be very much affected by the backing or support. All backing or support sheet materials should be flexible but they can vary widely in their ability to conform to an adherend or substrate. A relatively nonelastic backing such as a polymer film may not be deformable enough, acting in concert with the adhesive, to result in the best compliance on some substrates. Then a more elastic backing may be needed such as a nonfoamed elastomer sheet material or even a foamed polymeric material such as polyurethane, polyvinyl chloride or the like.

Those skilled in the art are cognizant of the fact that all adherends do not have the same surface properties from both a topographical and physical chemistry point of view. However, the industry seems to have settled predomonantly on two adhesive types viz. acrylate and phenyl substituted organo polysiloxane. Examples of the former are disclosed in U.S. Pat. No. 3,959,210 and U.S. Pat. No. 4,415,615 while the latter is exemplified by U.S. Pat. No. 3,839,075 and U.S. Pat. No. 2,882,183. The double sided adhesive tape of the instant invention may carry such a phenyl substituted organo-polysiloxane on both sides or alternatively only on one side with the other side being coated with an acrylate based adhesive such as those described in these patents. None of these references teaches a double sided adhesive tape nor a double sided tape with an acrylate adhesive on one side and a phenyl substituted adhesive on the other. U.S. Pat. No. 4,415,615 does, however, describe a double sided adhesive tape of the same general type as that of the present invention but has both sides of a backing or support layer coated with a foamed pressure sensitive adhesive of the acrylate type. A double sided pressure sensitive adhesive tape more akin to that of the invention is shown in the 3M #4205 acrylic foam tape product bulletin. This tape is made up of an acrylic foam support sheet coated on both sides with an acrylic or acrylate adhesive.

The aforedescribed tapes that carry acrylic or acrylate type adhesives differ from the tapes of the invention oin that the acrylate adhesives are relatively high surface energy materials whereas the invention requires that at least one side of the tape is coated with a relatively low surface energy adhesive such as that taught by U.S. Pat. No. 2,882,183 or even more desirably, an adhesive wherein the organo substitution on the polysiloxane moity is predominantly phenyl. According to several workers in the field, as pointed out on pages 40–42 of the Handbook of Pressure Sensitive Adhesive Technology, to have good pressure sensitive tack, an adhesive should have low surface energy. However, it is also pointed out that the maximum work of adhesion between simple liquids and solids is for liquids with surface tensions greater than the solids, the reasoning being that the greatest rate of wetting would be achieved by adhesives having surface tensions greater than the critical surface tensions of the solids involved. It has been observed experimentally that a maximum of probe tack (ASTM D14) is attained when the surface energy of the adhesive is greater than that of the adherend.

However, it has now been found that for certain combinations of adhesives and adherends, maximum adhesion is obtained by utilizing an adhesive with a surface energy substantially lower than the surface energy of the intended adherend. If the findings of prior workers, set out above, were universal, an acrylic adhesive with a surface tension of 38 dynes/cm should adhere well to a paint with a surface tension of 36 dynes/cm. However, it was discovered that a silicone based adhesive with a surface tension of less than 30 dynes/cm was far superior. It was from that finding that the present invention evolved.

Of particular interest are two recent trends in the automobile industry. More and more the industry is shifting to attaching body side moldings, bumper trim, and decals, with adhesives and usually double sided adhesive tape. One of the better materials for that purpose is described in Technology on a Roll—Acrylic Foam Tape #4205, a product bulletin published by the 3M Company. The tape has a foam backing or support coated on both sides with an acrylic adhesive. The automobile industry has also modified its paint system. More and more the paint system being applied has shifted from lacquers and enamels to a combination of a colored base coat covered with a clear acrylic overcoat. This combination is presenting problems for adhesive tapes such as that described in the aforementioned 3M product brochure which were developed for use on lacquers and enamels. The problem is poorer adhesion. It is this problem which the present invention overcomes.

DISCLOSURE OF THE INVENTION

In the product of the present invention the backing or support material may be any of the sheet materials currently used as backings for pressure sensitive adhesion tapes. The primary criteria for selecting a backing material are the intended end use for the tape and the cost of the material. Examples of some solid sheet materials are polyacrylate, polyurethane, polyester, polyamide and the like. The support film or sheet may also be foamed and in fact, should be a foamed material if the finished tape is to be used on a surface or surfaces that typically have surface irregularities. Polychloroprene, polyvinylchloride, polyacrylate and polyurethane are examples of suitable foamed sheet material.

With respect to the low surface energy adhesive, the term low surface energy is, of course, a relative one. The surface energy, more specifically the critical surface tension of the low surface energy adhesive, should be less than the adherend to which it is to adhere. Preferably its critical surface tension should be less than 30 dynes/cm for optimum adhesion. An example of such an adhesive is one based on a phenyl substituted polysiloxane such as General Electric Co.'s PSA 6574 pressure sensitive adhesive properly compounded with a silicone resin such as General Electric Co.'s SR 545. The low surface energy adhesive can have the following composition:

| Componant | Parts by Weight |
|---|---|
| phenyl based adhesive | 100 |
| silicone resin | 0–35 |
| catalyst | 0–5 |

The catalyst may be any of the known organic peroxides employed for this purpose such as benzoyl and dichlorobenzoyl peroxides, or 0–3 parts of a silane catalyst such as General Electric Co.'s SRC18. This formulation is also amenable to the addition of fillers, plasticizers and oils. Minor quantities of methyl based pressure sensitive adhesive may also be incorporated to control or modify the adhesives release properties.

If only one of the surfaces to be bonded is of the low surface energy type, such as acrylic automotive paint, polytetrafluoroethylene, polyethylene or the like, then only one side of the invention tape would be coated with a low surface energy adhesive, the other side of the tape being coated with a relatively higher surface energy adhesive. For example, if side body moulding made of polyvinyl chloride is to be attached to an automobile with an acrylic paint overcoat then the tape would have a phenyl substituted silicone adhesive on one side to bond to the acrylic paint but an acrylic adhesive on the other to bond to the polyvinyl chloride side body molding. It is desirable to utilize an acrylic based adhesive in contact with the polyvinyl chloride rather than the silicone adhesive because silicone pressure sensitive adhesives do not have good resistance to deterioration by plasticizers whereas the acrylic type pressure sensitive adhesives do. The high surface energy adhesives would normally have a critical surface tension of not less than about 30 dynes/cm and if used on the other side of a phenyl substituted adhesive coated tape, there should be a difference in critical surface tensions of the two pressure sensitive adhesives of at least 20%.

Because the tape of the invention uses a phenyl substituted silicone pressure sensitive adhesive on at least one side, care must be used in selecting a release liner. Basically any of the usual substrates are acceptable such as paper, paper coated with plastic or clay, and various polymer films such as polyethylene terephthalate, polypropylene, polycarbonate, polyethylene and the like. However, the run of the mill release coatings are not effective in releasing the phenyl silicone adhesive. The release coating must be a methyl substituted silicone resin which is capable of being cured completely on the liner material and which can be coated to form an essentially perfect continuous film on the liner and which is incompatible with the phenyl-silicone pressure sensitive adhesive. The release coating should have the following composition:

| Component | Parts by Weight |
|---|---|
| methyl based silicone | 100 |
| catalyst | 0.5–20 |
| inhibitor | 0–5 |
| cross linker | 0–15 |

There are many combinations of materials which may be employed to cross link or cure, inhibit the curing, and catalyze it, which are all well known.

EXAMPLE OF THE PREFERRED EMBODIMENTS

A double sided pressure sensitive adhesive tape having a low surface energy phenyl substituted silicone adhesive on one side and a higher surface energy acrylic adhesive on the other was manufactured in the following manner:

A release liner was made by taking a sheet of polyester which was 0.05 mm thick and coating it on both sides in the conventional manner with a methyl based silicone having the following composition:

| Material* | Parts by Weight |
|---|---|
| SL-5050 methyl silicone | 66.60 |
| SL-5060 platinum catalyst | 33.40 |
| SL-5040 bath inhibitor | 0.67 |
| SS-4300C cross linking agent | 4.00 |

*All materials were manufactured and/or sold by General Electric Company

The coating was cured by heat treating the coated sheet in a mechanically convected oven for 36 seconds with the oven temperature starting out at 70° C. and gradually increasing to 150° C. The coating on both sides was about 0.0025 mm thick or approximately 1.0 gm/m².

A low surface energy adhesive formulation made up of:

| Material | Parts by Weight |
|---|---|
| PSA 6574 phenyl-silicone adhesive | 100.0 |
| 2.4-dichlorobenzoyl peroxide | 1.0 |
| SR-545 silicone resin | 15.0 | was coated onto one side of the above prepared release liner and heat treated about 2 minutes at 80° C. to remove the solvent, then at 160° C. for about 2 minutes to activate the peroxide catalyst. The PSA-6574 and the SR-545 were manufactured by General Electric Company. The adhesive was then transferred to a previously prepared foamed polyurethane sheet 0.8 mm thick, and having a density of 44.9 Mg/m$^3$ (28 lb/ft$^3$), an elongation of 250%, a tensile strength of $1.37 \times 10^6$ N/m$^2$ (200 psi) water absorption of less than 5%, and 10% force to compress of $6.9 \times 10^4$ N/m$^2$ (10 psi).

A cross linkable acrylate pressure sensitive adhesive having a critical surface tension of approximately 36 dynes/cm was coated on the side of the polyurethane foamed sheet opposite to that side of the sheet which was previously coated with the phenyl substituted silicone adhesive. By comparison, the silicone adhesive had a critical surface tension of about 28 dynes/cm. The acrylate adhesive was RA-2465 manufactured and/or sold by Monsanto Company.

Using the thusly prepared double sided pressure sensitive adhesive tape, the adhesive properties of the phenyl based silicone adhesive was compared against two commercially available products with acrylic adhesive on a low surface energy clear acrylic automotive paint with the following results:

| Adhesive | 1 Hr. Dwell 180° Peel | Pluck | Cleavage Peel | Continuous Peel |
|---|---|---|---|---|
| phenyl-silicone | 1.2 kg/cm 6.5 lb/in | 9.8 kg/cm 55 lb/in | 5.0 kg/cm 28 lb/in | 1.6 kg/cm 9 lb/in |
| product A* | 0.9 kg/cm 5.1 lb/in | 6.2 kg/cm 35 lb/in | 3.6 kg/cm 20 lb/in | 1.1 kg/cm 6 lb/in |
| product B** | 0.8 kg/cm 4.3 lb/in | 6.8 kg/cm 38 lb/in | 3.9 kg/cm 22 lb/in | 1.3 kg/cm 7 lb/in |

*8062 from Norwood Chemical Co.
**4265 from 3M

As can be readily seen from the foregoing data, the phenyl substituted silicone adhesive showed a 27 to 57% superiority over two different commercially available acrylic adhesives in bonding to a low surface energy acrylic based clear automotive coating. It is this type of acrylic adhesive that is being utilized on double sided pressure sensitive adhesive type to attach body side moldings and the like to clear acrylic clear automotive paint.

Another unexpected property of the phenyl substituted low surface energy adhesive is its high degree of quickstick to low surface energy materials as shown by the data in the following table:

| Adhesive | 2 Minute Dwell 180° Peel |
|---|---|
| phenyl-silicone | 0.9 kg/cm 4.8 lb/in |
| acrylic A* | 0.5 kg/cm 2.8 lb/in |
| acrylic B** | 0.6 kg/cm 3.3 lb/in |

*Same as above.

These results are unexpected because of the greatly lower finger tack of the phenyl substituted silicone pressure sensitive adhesive should produce poorer quick stick properties.

What is claimed is:

1. A double sided pressure sensitive adhesive tape comprising a flexible support with a first side thereof coated with a low surface energy pressure sensitive adhesive, a second side thereof being coated with a pressure sensitive adhesive which has a surface energy higher than the pressure sensitive adhesive on said fire side, and including a release liner.

2. The double sided pressure sensitive adhesive tape of claim 1 wherein said low surface energy pressure sensitive adhesive has a critical surface tension of less than about 30 dynes/cm.

3. The double sided pressure sensitive tape of claim 1 wherein said low surface energy pressure sensitive adhesive has a critical surface tension of less than about 30 dynes/cm, said high surface energy pressure sensitive adhesive has a critical surface tension of greater than about 30 dynes/cm, and the critical surface tensions of the low surface energy and high surface energy pressure sensitive adhesives differ by at least 20%.

4. The double sided pressure sensitive adhesive tape of any one of claims 1, 2, or 3, wherein said low surface energy pressure sensitive adhesive is a phenyl substituted silicone.

5. The double sided pressure sensitive adhesive tape of any one of claims 1 or 3 wherein said high surface energy pressure sensitive adhesive is an acrylic based adhesive.

* * * * *